US007953118B2

(12) United States Patent
Krantz et al.

(10) Patent No.: US 7,953,118 B2
(45) Date of Patent: May 31, 2011

(54) SYNCHRONIZING MEDIA STREAMS ACROSS MULTIPLE DEVICES

(75) Inventors: Anton Krantz, Kirkland, WA (US); Niraj Khanchandani, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/608,714

(22) Filed: Dec. 8, 2006

(65) Prior Publication Data

US 2008/0137690 A1    Jun. 12, 2008

(51) Int. Cl.
*H04J 3/06*       (2006.01)
(52) U.S. Cl. ........................................................ 370/503
(58) Field of Classification Search .................. 370/464, 370/498, 503, 310, 345, 350, 516, 517, 519
See application file for complete search history.

(56) References Cited

U.S. PATENT DOCUMENTS

| | | | |
|---|---|---|---|
| 5,570,372 A | 10/1996 | Shaffer | 370/108 |
| 6,230,141 B1 | 5/2001 | Bohm | |
| 6,922,731 B1* | 7/2005 | Morioka et al. | 709/231 |
| 6,956,871 B2 | 10/2005 | Wang | |
| 7,024,575 B2 | 4/2006 | Lienhart | |
| 7,084,898 B1 | 8/2006 | Firestone | |
| 7,263,095 B1* | 8/2007 | Sarkar | 370/352 |
| 2002/0136162 A1* | 9/2002 | Yoshimura et al. | 370/229 |
| 2004/0119814 A1* | 6/2004 | Clisham et al. | 348/14.08 |
| 2004/0128342 A1 | 7/2004 | Maes | |
| 2005/0078171 A1* | 4/2005 | Firestone et al. | 348/14.08 |
| 2005/0172232 A1 | 8/2005 | Wiseman | |
| 2005/0232151 A1* | 10/2005 | Chapweske et al. | 370/231 |
| 2005/0254440 A1 | 11/2005 | Sorrell | |
| 2005/0259694 A1 | 11/2005 | Garudadri | |
| 2005/0281246 A1 | 12/2005 | Seo | |
| 2006/0140175 A1 | 6/2006 | Han | |
| 2006/0156374 A1 | 7/2006 | Hu | |
| 2006/0171378 A1* | 8/2006 | Harris et al. | 370/352 |

OTHER PUBLICATIONS

Class et al., 1998, *Local Computer Networks*, LCN '98. Proceedings, 23rd Annual Conference on Oct. 11-14, 1998, pp. 140-149 "A methodology to assess synchronization algorithms for distributed applications".

Liu et al., 2003, *Object-Oriented Real-Time Dependable Systems*, Proceedings. Ninth IEEE International Workshop on Oct. 1-3, 2003, pp. 79-86. "Towards the delay and synchronization control for networked real-time multiobject multimedia applications".

(Continued)

*Primary Examiner* — Kwang B Yao
*Assistant Examiner* — Obaidul Huq
(74) *Attorney, Agent, or Firm* — Merchant & Gould

(57) ABSTRACT

Aspects of the present invention are directed at establishing a multimedia network session in which the transmission of media streams is synchronized. In one embodiment, a method is provided for synchronizing incoming audio and video streams. The method includes establishing a communication channel between a first computing device that is receiving an incoming audio stream with the second computing device that is receiving an incoming video stream. Once the communication channel is established, the current network conditions that describe attributes of the incoming audio stream are obtained by the first computing device. Then, the delay in the incoming audio stream is calculated. When the delay is known, the method causes the incoming video stream to be delayed to match the delay in the incoming audio stream.

20 Claims, 3 Drawing Sheets

OTHER PUBLICATIONS

PCT International Search Report dated Feb. 12, 2008 cited in International Application No. PCT/US2007/079596.

Blank, T., and R. Atkinson, "Synchronization Strategies for IP Networked Home Audio Equipment," Convergence: the Impact of Computers & Networking on Future Audio Technology, Audio Engineering Society 19th UK Conference, Cambridge, United Kingdom, Mar. 31, 2005, pp. 1-11.

Furfaro, A., et al., "Multimedia Synchronization Based on Aspect Oriented Programming," Mircoprocessors and Microsystems 28(2): 47-56, 2004.

Ogawa, A., et al., "Design and Implementation of DV based video over RTP," in Packet Video Workshop, May 2000.

Sisalem, D., "End-To-End Quality of Service Control Using Adaptive Applications", IFIP Fifth International Workshop on Quality of Service IWQOS '97, New York, May 1997.

* cited by examiner

SYNCHRONIZING MEDIA STREAMS ACROSS MULTIPLE DEVICES

BACKGROUND

Modern networks have revolutionized the ways in which people obtain information. In this regard, IP data networks developed for the Internet provide an opportunity for users to interact utilizing multimedia communications. For example, a computing device with the appropriate hardware and software allows a user to send/receive video, audio, instant messages (e.g., text), and the like between other networked computing devices. Data transmitted over the IP data network is processed into a sequence of data blocks, called packets that adhere to IP protocols capable of communicating a variety of media types. With a personal computer, such as a desktop or laptop, users may establish multimedia network sessions in which different media types are communicated concurrently.

Increasingly, media-specific computing devices are being developed that are configured to transmit a media stream directly over an IP data network. For example, an IP phone implements functionality to digitize analog phone signals, partition the digitized signal into packets, and transmit the packets to another IP networked computing device. In this example, the audio data may be packetized in accordance with the Voice over Internet Protocol ("VoIP").

In a multimedia network session, media streams (e.g., video and audio) may be transmitted between remote users. Those skilled in the art and others will recognize that systems have been developed to synchronize media streams when a user employs a single computing device to participate in the network session. However, with the development of media-specific computing devices such as IP phones, a user may employ multiple computing devices to participate in a network session. For example, a user may employ a system configuration where a desktop computer is closely associated with an IP phone. The user's preferences may dictate that audio data be sent/received using the IP phone while video data is sent/received using the desktop computer. In this regard, existing systems are unable to reliably synchronize media streams that are communicated across multiple computing devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at establishing a multimedia network session in which the transmission of media streams across multiple computing devices is synchronized. In one embodiment, a method is provided for synchronizing incoming audio and video streams. More specifically, the method includes establishing a communication channel between a first computing device that is receiving an incoming audio stream with the second computing device that is receiving an incoming video stream. Once the communication channel is established, the current network conditions that describe attributes of the incoming audio stream are obtained by the first computing device. Then, the delay in the incoming audio stream is calculated. When the delay is known, the method causes the incoming video stream to be delayed to match the delay in the incoming audio stream. As a result, even though multiple devices are being used to participate in the multimedia network session, the rendering of the different media streams is synchronized.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention may be described in the general context of computer-executable instructions, such as program modules, being executed by a computer. Generally described, program modules include routines, programs, applications, widgets, objects, components, data structures, and the like that perform particular tasks or implement particular abstract data types. The present invention will typically be practiced in distributed computing environments where tasks are performed by remote processing devices that are linked through a communications network. In a distributed computing environment, program modules may be located on local and/or remote computer storage media.

While aspects of the present invention will primarily be described in the context of synchronizing media streams when multiple devices are being employed to participate in a multimedia network session, those skilled in the relevant art and others will recognize that aspects of the invention are also applicable to other areas than those described. In any event, the following description first provides an overview of an environment in which aspects of the invention may be implemented. Then, a routine that implements aspects of the invention is described. However, the illustrative examples provided herein are not intended to be exhaustive or to limit the claimed subject matter to the precise forms disclosed. Similarly, any steps described herein may be interchangeable with other steps or combinations of steps in order to achieve the same result.

Figure 1:
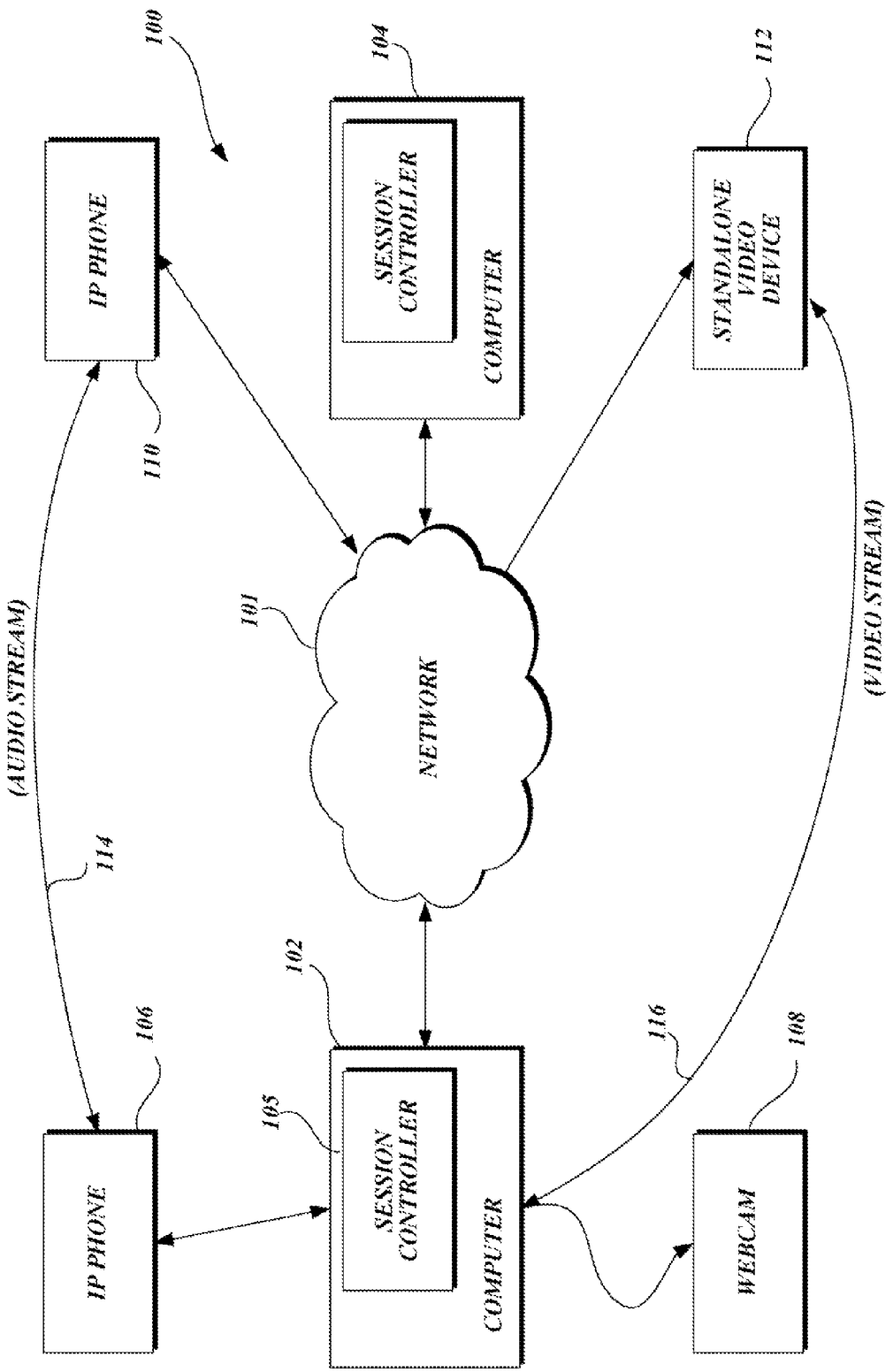
FIG. 1 illustrates a networking environment in which aspects of the present invention may be implemented.

FIG. 1 and the following discussion is intended to provide a brief, general description of a networking environment 100 in which aspects of the present invention may be implemented. As illustrated in FIG. 1, the networking environment 100 is comprised of the computers 102-104 that are communicatively connected via the network 101. In this example, the computers 102-104 include a software system that operates as a session controller 105 to manage the exchange control information in a multimedia network session. By way of example only, the computers 102-104 may be desktop computers, laptop computers, mini- and mainframe computers, server computers, hand-held computing devices such as personal digital assistants and tablets, microprocessor-based and/or programmable consumer electronics including media systems, set-top boxes, gaming systems, or any other computing device capable of serving as a session controller. Those skilled in the art and others will recognize that the network 101 may be implemented as a local area network ("LAN"), wide area network ("WAN"), cellular network, IEEE 802.11, Bluetooth wireless networks, and the like. Typically, the network 101 will be the global network commonly known as the Internet or World Wide Web ("WWW"). However, those skilled in the art will recognize that the invention may also be used in other interactive environments, such as local or wide area networks or any other data networks that communicate using IP protocols.

As further illustrated in FIG. 1, the computer 102 is associated with the IP phone 106 and the WebCam 108. Moreover, the computer 104 is associated with the IP phone 110 and the stand-alone video device 112. In this regard, the stand-alone video device 112 may be any device that is capable of receiving and rendering a sequence of images in real time. By way of example only, the stand-alone video device 112 may be a computer that is associated with a Web camera, a television, an entertainment system, a gaming system, etc. In this exemplary embodiment, the WebCam 108 communicates with the computer 102 over a direct communication link. In providing a direct communication link between the WebCam 108 and the computer 102, any one of the number of protocols may be used to facilitate communication, including but not limited to, Universal Serial Bus ("USB"), FireWire (also known as "IEEE 1394" or "iLink"), and the like. The IP phone 106 communicates with the computer 102 using computer networking systems developed for local area networks. Similarly, the IP phone 110 and the stand-alone media device 112 may also communicate with the computer 104 using computer networking systems developed for local area networks. By way of example only, these systems for communicating between local devices may include Ethernet networking technologies developed in accordance with the IEEE 802.3 standard. However, those skilled in the art and others will recognize that other local area network technologies (such as Wi-Fi systems that adhere to the IEEE standard 802.11 standard) may also be utilized.

Through local network connections, data may be transmitted from the IP phone 106 to the computer 102. Also, those skilled in the art in others will recognize that local network connections may be used to transmit data directly over the network 101. It should also be noted that, while the present invention is generally described in terms of operating in conjunction with specific types of computing devices and networks, this is for illustration purposes only and should not be construed as limiting.

To establish a multimedia network session, control information is exchanged between various computing devices. In this regard, the Session Initiation Protocol ("SIP") is an exemplary protocol for initiating, modifying, and terminating a network session that involves multimedia streams such as video and audio. However, those skilled in the art and others will recognize that other protocols may be used to exchange control information. In this regard and by way of example only, control information may be exchanged utilizing SIP or the Media Gateway Control Protocol (MGCP), Megaco/ H.248, Simple Object Access Protocol (SOAP), Extensible Messaging and Presence Protocol ("XMPP"), and the like.

In the embodiment illustrated in FIG. 1, users employ a plurality of computing devices to send/receive different media streams during a multimedia network session. In this regard, direct communication channels are established between computing devices that are preferred for communicating a particular media stream. As illustrated in FIG. 1, control information is exchanged that enables the IP phones 106 and 110 to directly communicate audio data over the direct communication channel 114. With regard to video data, the direct communication channel 116 is established between the computer 102 and the stand-alone video device 112. Once direct communication channels have been established, media streams may be communicated between preferred devices without being routed through a computer that serves as the session controller.

Traditionally, users have been unable to employ multiple computing devices to participate in a multimedia network session. Instead, only those I/O devices (Web camera, headphone, microphone, etc) directly connected to a computing device have been available to participate in a multimedia network session. As a result, systems for synchronizing media streams across multiple computing devices were not necessary. However, users are no longer limited to the I/O devices associated with a single computing device to participate in a multimedia network session. Instead, systems have been developed that allow users to employ multiple computing devices to transmit media streams in a multimedia network session. For example, in the example depicted in FIG. 1, a user may employ a system configuration where the IP phone 106 is used to send/receive audio data while the computer 102 sends/receives video data. Another user may employ a system configuration where the IP phone 110 is used to send/receive audio data while the stand-alone video device 112 sends/ receives video data. In this instance the computer 104 merely serves as a session controller managing the exchange of control information.

Generally described, aspects of the present invention synchronize media streams when multiple computing devices are being used to participate in a network session. For example, during a multimedia network session, an audio stream may be transmitted over the over the direct communication channel 114 while the video stream is transmitted over the direct communication channel 116. Even though multiple computing devices are being employed to participate in the multimedia network session, the different media streams are synchronized when presented to the user.

Figure 2:
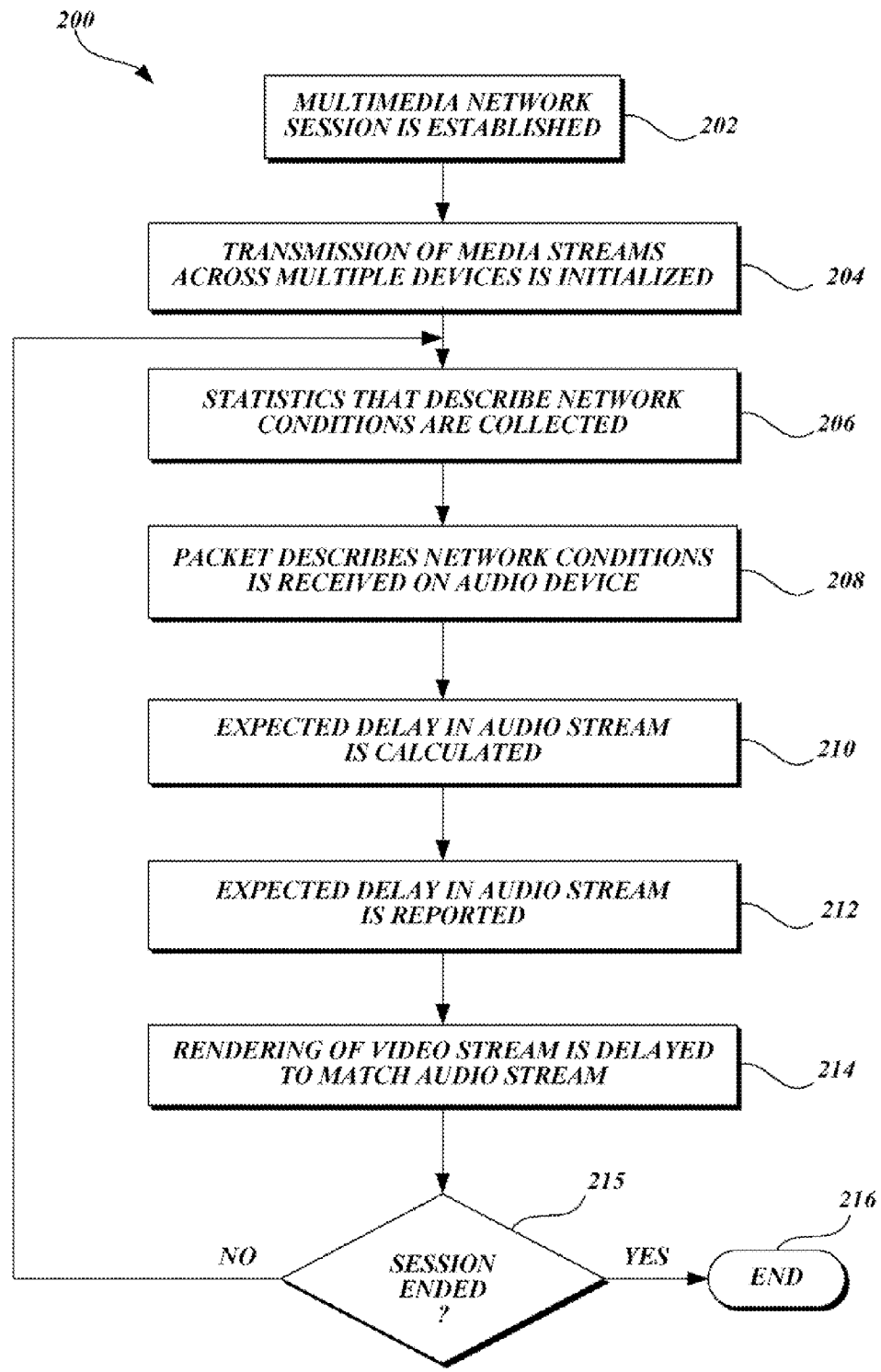
FIG. 2 illustrates a routine that synchronizes media streams being transmitted across multiple computing devices.

With reference now to FIG. 2, a flow diagram illustrative of a synchronization routine 200 will be described. Generally stated, the synchronization routine 200 performs processing that synchronizes media stream being transmitted across multiple computing devices. In this regard, processing performed by the synchronization routine 200 extends the functionality of a network architecture so that media streams transmitted on different communication channels are synchronized. As mentioned previously, aspects of the present invention may be implemented in different types of networks, including wide and local area networks that utilize a variety of protocols. In this regard, a multimedia network session may be established between devices and networks that maintain different configurations. For example, a user may employ a computer that serves as a session controller to transmit a media stream. Also, one or more media-specific devices may be used to transmit a media stream during the same network session.

As illustrated in FIG. 2, the synchronization routine 200 begins at block 202 when a multimedia network session in which media streams are transmitted across multiple devices is established. As mentioned previously, the Session Initiation Protocol ("SIP") is an exemplary protocol for initiating, modifying, and terminating a network session that involves media streams, such as video and audio. In accordance with one embodiment, SIP is utilized to exchange control information between remote devices so that the multimedia network session may be established, at block 202. However, since establishing the multimedia network session may be performed using systems outside the scope of the present invention, these systems will not be described in detail here.

At block 204, transmission of the media streams between devices associated with remote users is initiated. As mentioned previously, the media streams are transmitted over direct communication channels without being routed through a computer that serves as a session controller. In one embodiment, data in a media stream may be packetized and transmitted in accordance with standards dictated by the real-time transport protocol ("RTP"). In this regard, RTP is one exemplary Internet standard protocol that may be used to transmit real-time data including video and audio. However, those skilled in the art and others will recognize that a media stream may be may be transmitted using other media transport layer protocols without departing from the scope of the claimed subject matter.

Once the transmission of the media streams are initiated, the network conditions are observed and statistics that describe the network conditions are collected, at block 206. In this regard, network conditions are observed and statistics collected for each of the communication channels being used to transmit a media stream. For example, in the networking environment 100 depicted in FIG. 1, statistics that describe the transmission of data over each of the direct communication channels 114-116 is collected.

As mentioned previously, RTP may be used as the media transport protocol in transmitting various types of media streams. When RTP is used as the media transport protocol, the real-time control protocol ("RTCP") may be used to exchange messages and distribute statistics that describe network conditions. These statistics describe a number of different network variables regarding the transmission of data. More specifically, network variables including packet loss rates and jitter that affect the delay in transmitting the media stream are collected. These network conditions may be periodically reported to devices that are sending/receiving a media stream. Typically, this data has been used to adjust the properties of the media stream to more appropriately account for network conditions. However, as described in further detail below, aspects of the present invention use this information to synchronize media streams that are being transmitted across multiple devices.

At block 208, a computing device that is sending/receiving an audio stream receives a data packet that describes the current network conditions. For illustrative purposes, the synchronization routine 200 is described in the context of synchronizing audio and video streams being transmitted to the IP phone 106 and computer 102, respectively. In this regard, those skilled in the art and others will recognize that RTCP packets may be periodically transmitted between computing devices that are participating in a multimedia network session. In some systems, RTCP packets report statistics that describe current network conditions every five (5) seconds. In the example depicted in FIG. 1, an RTCP packet may be transmitted over the communication channel 114 from the IP phone 110 to the IP phone 106. When the packet is received, the IP phone 106 obtains data that describes the current network conditions. Moreover, other computing devices participating in the multimedia network session may also periodically receive data that describes the network conditions on their respective communication channels. For example, the computer 102 may periodically receive RTCP packets that describe the transmission of a video stream on the communication channel 116.

As illustrated in FIG. 2, at block 210, the expected delay in transmitting the audio stream is calculated. In this example, processing executed on the IP phone 106 by aspects of the present invention calculates the expected delay in presenting the audio stream to a user. More specifically, data in the RTCP packet received at block 208 that includes the packet loss rate and jitter may be used to calculate the expected delay in the audio stream. In performing this calculation, a numeric value (e.g. two seconds) that represents the expected delay in the audio stream is identified.

At block 212, a set of data that includes the expected delay in the audio stream is reported to a computer that serves as a session controller. In one embodiment, processing is performed to "pair" devices that are being employed by a user to participate in a multimedia network session. More specifically, the IP phone 106 and computer 102 may be paired when the multimedia network session is established. Once paired, these devices may freely exchange control information that relates to the multimedia network session. In the example depicted in FIG. 1, the IP phone 106 reports the set of data that includes the expected delay in the audio system to the computer 102, at block 212, using a previously established communication channel. More specifically, the IP phone 106 transmits a SIP-based info message to the computer 102, at block 212, with arguments that report the set of data that includes the expected delay in the audio stream. Moreover, the set of data transmitted at block 212 includes timing information corresponding to the IP phone 106. Those skilled in the art and others will recognize that the RTCP packet received by the IP phone 106, at block 208, contains both relative timing information that is reported as a RTP time and an absolute time that is reported as a NTP ("Network Time Protocol") time. By providing the RTP time and NTP time corresponding to the IP phone 106, processing may be performed on the computer 102 to identify a "real" time in which packets in the audio stream were received. Identifying a real time in which packets in the audio stream were received provides the computer 102 with information needed to synchronize the video stream with the audio stream.

As further illustrated in FIG. 2, at block 214, the synchronization routine 200 causes the rendering of the video stream to be delayed to match the audio stream. As described previously, a computer that serves as a session controller may also be responsible for transmitting a media stream. For example, the IP phone 106 receives an audio stream during a multimedia network session while the paired computer 102 receives a video stream. In this example, data that may be used to calculate the delay in a video stream is periodically transmitted from the stand-alone video device 112 to the computer 102. Also, a set of data that includes the expected delay in the audio stream is reported in an info from the IP phone 106 to the computer 102, at block 212. As mentioned previously, when the set of data in the info message is received, the computer 102 may identify a "real" time in which packets in the audio stream were received by the IP phone 106. When the "real" time corresponding to the audio stream and the expected delay in both the video and audio streams is known, the extent in which the media streams are "out-of-synch" may be readily identified. In one embodiment, frames in a video stream are buffered in the memory of the computer 102 so that the delay in rendering the video stream matches the delay in the audio stream. As a result of delaying the video stream in this way, presentation of the audio and video streams is synchronized when presented to the user.

In an alternative embodiment, a media specific computing device may delay the rendering of a media stream. In the example depicted in FIG. 1, the computer 106 is not responsible for sending/receiving a media stream and only serves as a session controller. In this instance, the computer 106 may receive an info message from the IP phone 110 with a set of data that includes the expected delay in the audio stream. Then, another SIP-based info message with arguments that report the set of data that includes the expected delay in the audio stream may be transmitted to the stand-alone video device 112. When received, processing performed on the stand-alone video device 112 causes frames in a video stream to be buffered in memory to match the delay in the audio stream.

At decision block 215, a determination is made regarding whether the multimedia network session has ended. If the multimedia network session ended, the synchronization routine 200 proceeds to block 216, where it terminates. Conversely, if the multimedia network session has not ended, the synchronization routine 200 proceeds back to block 206, and blocks 206 through block 215 repeat until the multimedia network session is over.

The synchronization routine 200 described above with reference to FIG. 2 should be construed as exemplary and not limiting. In this regard, additional or fewer steps may be performed when synchronizing media streams across multiple computing devices. Moreover, steps may be performed in a different order than described. For example, while the synchronization routine 200 described above with reference to FIG. 2 causes a video stream to be delayed in order to match an audio stream, this is merely exemplary as an audio stream to be delayed to match the video stream. Also, while the examples above are provided in the context of audio and video streams, aspects of the present invention may be implemented to synchronize other types of media streams.

Figure 3:
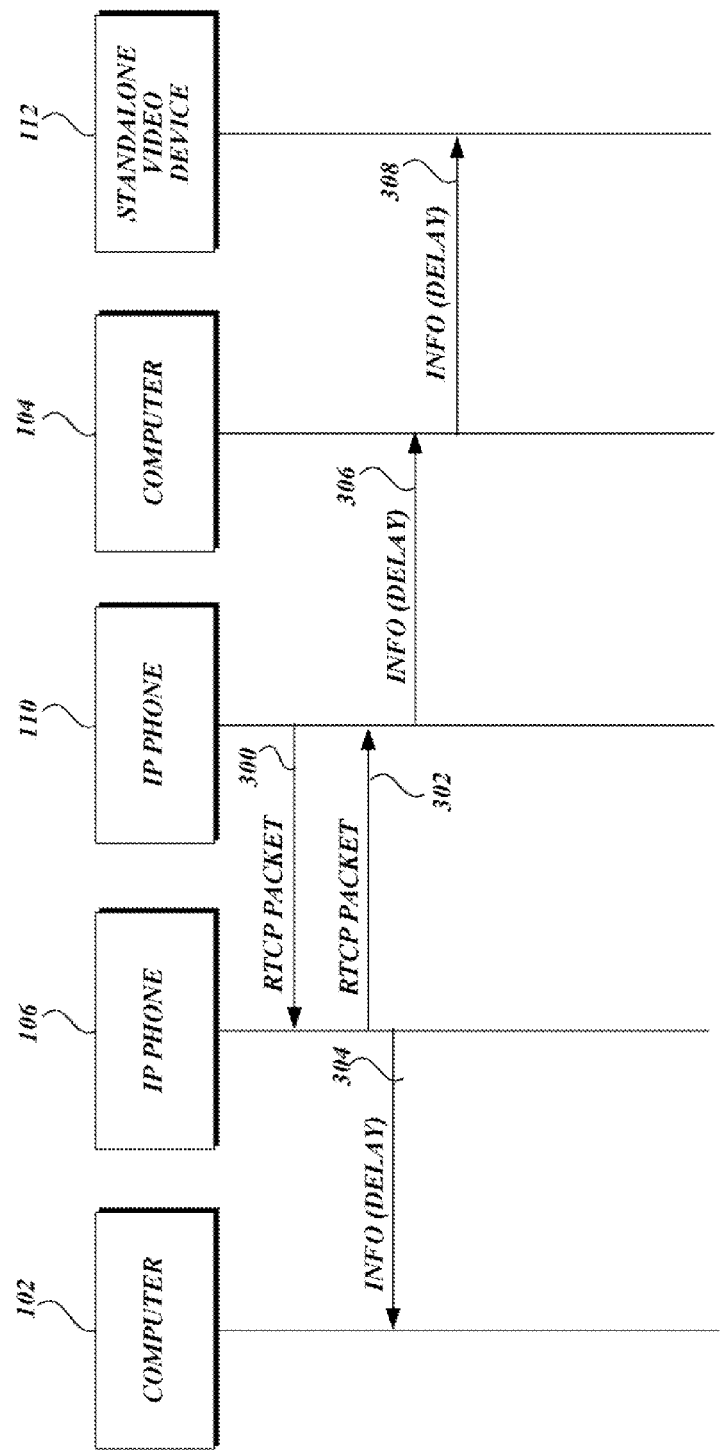
FIG. 3 illustrates an exemplary exchange of control information that occurs when media streams are synchronized.

For illustrative purposes, an exemplary exchange of control information between computing devices in the networking environment 100 (FIG. 1) is depicted in FIG. 3. The exchange of control information allows media streams that are being transmitted across multiple devices to be synchronized. As mentioned previously, a multimedia network session is established so that the IP phones 106 and 110 may directly communicate audio data over a direct communication channel. Moreover, video data is directly transmitted between the computer 102 and the stand-alone video device 112.

As illustrated in FIG. 3, an RTCP packet is transmitted from the IP phone 110 to the IP phone 106, at event 300. Similarly, an RTCP packet is transmitted from the IP phone 106 to the IP phone 110, at event 302. As mentioned previously, an RTCP packet may be periodically transmitted between devices that are exchanging one or more media streams. In this regard, packet loss rates and jitter reported in these RTCP packets may be used to calculate the expected delay in an incoming media stream.

In the embodiment illustrated in FIG. 3, processing executed on the IP phone 106 identifies the expected delay in the incoming audio stream. Then, the IP phone 106 transmits a SIP-based info message with arguments that report a set of data that includes the expected delay to the computer 102, at event 304. As described previously, processing implemented by aspects of the present invention on the computer 102 may cause the video stream to be buffered. As a result, rendering of the video stream may be delayed to match the audio stream. When the IP phone 106 receives each subsequent RTCP, an info message is transmitted to the computer 102 that reports a set of data that includes the estimated delay of the incoming audio stream. As a result, video and audio streams being transmitted on multiple devices may continually be synchronized during the multimedia network session.

As further illustrated in FIG. 3, when the IP phone 110 receives the RTCP packet, at event 302, the set of data that includes expected delay in the incoming audio stream is calculated. Then, similar to the description provided above, the IP phone 110 transmits a SIP-based info message with arguments that report the set of data that includes the expected delay in the audio stream to the computer 104, at event 306. Since the computer 104 does not send/receive a media stream, the info message that reports the expected delay in the audio stream is forwarded to the stand-alone media device 112, at event 308. As described previously, processing performed on the stand-alone video device 112 may cause frames in the incoming video stream to be buffered to match the delay in the incoming audio stream. As a result, each of the media streams may be synchronized even though the media streams are being transmitted across different devices.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of synchronizing incoming audio and video streams, the method comprising:
    establishing a first direct communication channel between a first computing device and an audio computing device that are used for sending/receiving the audio stream; wherein the first computing device is a first endpoint of the audio stream and the audio computing device is a second endpoint of the audio stream;
    establishing a second direct communication channel between a second computing device and a video computing device that are used for sending/receiving the video stream;
    establishing another computing device as a session controller; wherein the session controller causes a delay in a rendering of the video stream; wherein the audio stream and the video stream are not routed through the session controller;
    at least one of the first computing device and the second computing device obtaining current network conditions and calculating a delay in receiving the incoming audio stream at one of the computing devices used for sending/receiving the audio stream that describe attributes of the incoming audio stream;
    relaying the delay to the session controller and the session controller causing the rendering of the video stream to be delayed; wherein the delay synchronizes a presentation of the audio stream and the video stream.

2. The method as recited in claim 1, wherein the first computing device and the second computing device each maintain a separate network connection to transmit data over an IP data network.

3. The method as recited in claim 1, further comprising collecting and distributing SIP-based control messages from each computing device that participates in the multimedia network session.

4. The method as recited in claim 1, wherein obtaining the current network conditions, includes:
    periodically receiving a real time control protocol packet; and
    wherein the real-time control protocol packet includes data that describes the packet loss rate and jitter for the incoming audio stream.

5. The method as recited in claim 1, wherein delaying the rendering of the video stream includes identifying a real time in which packets in the incoming audio stream were received from RTP and NTP time information corresponding to the first computing device.

6. The method as recited in claim 1, wherein delaying the rendering of the video stream, includes:
    creating a SIP-based info message with arguments that identifies the delay in the audio stream; and reporting the SIP-based info message to the session controller.

7. The method as recited in claim 6, further comprising:
forwarding the SIP-based info message to the computing device that is rendering video stream.

8. The method as recited in claim 1, wherein delaying the rendering of the video stream, includes:
identifying an amount of time that the incoming audio and video streams are out of synchronization; and
buffering the video stream in memory the identified amount of time that the incoming audio and video streams are out of synchronization.

9. The method as recited in claim 1, wherein the first computing device is an IP phone and the second computing device is a stand-alone media device.

10. A computer-readable memory storing computer-readable instructions which when executed, performs a method of synchronizing real-time media streams that are transmitted across multiple computing devices, the method comprising:
allowing users to employ multiple devices to participate in a multimedia network session;
wherein during the multimedia network session a first media stream is directly transmitted between a first set of directly connected network endpoints and a second media stream is directly transmitted between a second set of directly connected network endpoints;
at least one of the directly connected network endpoints obtaining current network conditions and calculating a delay in receiving at least one of the media streams;
distributing data to a session controller that describes the network conditions at both the first and second set of network endpoints; and
the session controller accounting for the network conditions to cause the first media stream to be rendered synchronously with the second media stream; wherein the first media stream and the second media stream are not routed through the session controller.

11. The computer-readable memory as recited in claim 10, wherein the delay is calculated by a computing device within one set of the network endpoints.

12. The computer-readable memory as recited in claim 10, wherein allowing users to employ multiple devices to participate in a multimedia network session includes collecting and distributing SIP-based control messages from each computing device that will participate in the multimedia network session.

13. The computer-readable memory as recited in claim 10, wherein distributing data that describes the network conditions includes causing RTCP packets that identify packet loss rate and jitter to be exchanged between the first and second set of network endpoints.

14. The computer-readable memory as recited in claim 10, wherein accounting for the network conditions to cause the first media stream to be rendered synchronously with the second media stream, includes:
calculating the delay in rendering incoming video and audio streams caused by variables in network conditions; and
identifying the difference between when the video and audio streams are capable of being rendered.

15. The computer-readable memory as recited in claim 14, further comprising buffering at least one of the incoming media streams to eliminate the difference in when the streams are rendered.

16. The computer-readable memory as recited in claim 14, wherein calculating the delay in rendering incoming video and audio streams includes transmitting a SIP-based info message from a computing device that is receiving an incoming media stream to a computing device that is serving as a session controller.

17. The computer-readable memory as recited in claim 10, wherein the multiple devices employed to participate in the multimedia network session are a computer and an IP phone.

18. A system for synchronizing media streams being transmitted across multiple computing devices, the system comprising:
first and second session controller computing devices that each execute computer executable components for synchronizing media streams being transmitted over an IP data network; including:
a management component for causing control information to be exchanged that enables users to employ multiple computing devices to participate in a multimedia network session;
an adjustment component operative to cause a first media stream to be rendered concurrently with a second media stream;
a first media-specific computing device with computer executable components for reporting the delay in the first media stream to the first session controller computing device, wherein the first media stream is not routed through either the first session controller computing device and the second session controller computing device; and
a second media-specific computing device with computer executable components for reporting the delay in the first media stream to the second session controller computing device.

19. The system as recited in claim 18, wherein to cause a first media stream to be rendered concurrently with a second media stream, includes:
identifying the amount of time that the first and second media streams are out of synchronization; and
causing the first media stream to be buffered to eliminate the difference between when the first and second media streams are rendered.

20. The system as recited in claim 18, wherein reporting the delay in the first media stream to the first session controller computing device includes:
creating a SIP-based info message with arguments that identifies the delay in the first media stream; and
transmitting the SIP-based info message from the first media specific computing device to the first media controller computing device over an established communication channel.

* * * * *